Dec. 13, 1960 G. L. HOBROUGH 2,964,644

METHOD AND APPARATUS FOR LOCATING CORRESPONDING AREAS OF TWO SIMILAR IMAGES

Filed Nov. 14, 1957 2 Sheets-Sheet 1

Inventor
GILBERT L. HOBROUGH
by: J. Richard Cavanagh
Patent Agent

Dec. 13, 1960 G. L. HOBROUGH 2,964,644
METHOD AND APPARATUS FOR LOCATING CORRESPONDING AREAS OF TWO SIMILAR IMAGES
Filed Nov. 14, 1957 2 Sheets-Sheet 2

Inventor
GILBERT L. HOBROUGH
by: J. Richard Cavanagh
Patent Agent 2,964,644
Patented Dec. 13, 1960

2,964,644

METHOD AND APPARATUS FOR LOCATING CORRESPONDING AREAS OF TWO SIMILAR IMAGES

Gilbert Louis Hobrough, Oshawa, Ontario, Canada, assignor, by mesne assignments, to Hunting Survey Corporation Limited, Toronto, Ontario, Canada Filed Nov. 14, 1957, Ser. No. 696,394

9 Claims. (Cl. 250—220)

This invention relates to improvements in photogrammetric methods and apparatus for locating corresponding points in two similar images. More especially the invention concerns methods and apparatus for simultaneously scanning two similar images on corresponding momentary paths of predetermined direction in such manner as to obtain an alignment error signal responsive to the magnitude and direction of error of alignment of the scanning paths with respect to the same point in the two images.

This invention embodies improvements in the methods and apparatus disclosed in my prior applications 604,843 for Image Inspecting System and Method, and 679,978 for Methods and Apparatus for Correlating Corresponding Points in Two Images, the said prior applications having been assigned to the same assignee as this application.

In application 604,843 a method of inspecting an image to obtain information to define a point therein is disclosed. Information is sensed from the image about the point to be defined, and an electrical signal is generated responsive to the information sensed whereby the signal and the information contained therein identify said point. The said application also discloses a method and apparatus for identifying corresponding points in two images such as stereoscopic photographic pairs, each having similar information about the point therein. One of the images is scanned about the point over a predetermined area and at a predetermined scanning rate. The other image is scanned at a corresponding rate over an area of a size similar to that of the predetermined area of the first scan. An electrical error signal is generated responsive to lack of similarity of the information scanned on the images. The error signal may be applied to correct the position of the second scan. The error signal becomes zero when both scans are in perfect alignment with corresponding points in the two images. In addition to the foregoing the said application discloses simultaneous expansion of both of the scanning patterns, sufficient to achieve a condition of correlation over large areas though the scans may not be aligned exactly on corresponding points.

In the said prior application the lack of correlation between the scans could be translated into co-ordinate information for the direction in which correction was required by utilizing a circular scanning pattern of slightly different size in one scan than in the other scan in a so-called "constant difference scanning method," so that under conditions of perfect alignment a uniform correlation signal would be obtained. If misalignment occurred in any direction a non-uniform correlation condition existed, from which an error signal could be derived containing phase and amplitude information corresponding to the direction of misalignment and the magnitude of the alignment error.

The method and apparatus of application 679,978 enable improved alignment under conditions of non uniform correlation. Corresponding scanning spots of similar size operate in the same direction on the same momentary scanning path or trace in both scans simultaneously, but the signal obtained from one of the scans has a fixed delay applied thereto, whereby to obtain a constant delay difference in a constant difference scanning method. The improvement herein set forth also embodies a further modified scanning method in which a balanced delay difference system is set forth whereby better to define misalignment directional information.

According to the present invention corresponding areas of two similar images containing similar information are scanned by moving a scanning spot simultaneously over each image on a momentary path of predetermined direction. The information encountered by the scanning spot in each image is sensed, or detected and a transient signal is generated responsive thereto and hence responsive to the information sensed in each image. The transient signals thus obtained are then processed to establish a single order differential difference therebetween, such as by differentiating one of the signals or by differentiating both of the signals, but in the latter case one of the signals is differentiated to the second degree. By this means the transient signals are rendered of improved significant information content. The transient signals having a single order of differential difference are then discriminated with respect to time in order to measure the time difference therebetween. An error signal is then generated responsive to the thus measured time difference and thereby responsive to the positional error of the scanned area on the images.

Having regard to the foregoing the objects and details of the invention will be understood by a study of the following specification setting forth preferred practice of the invention, taken in conjunction with the accompanying drawings.

In the drawings:

Figure 1 is a diagrammatic perspective of apparatus useful for the scanning of a stereoscopic pair of photographic images by the system and method herein;

Figure 2 is an electrical schematic of known electronic and electrical components arranged and combined according to the invention to provide an output error signal containing information concerning the direction and magnitude of misalignment of the scanning axis of one scan from a point in the image scanned, thereby corresponding to a predetermined selected point in the other image intersected by the axis of the other scan;

Figure 3 indicates a theoretical wave form of a transient signal generated responsive to information sensed by a scanning spot passing at right angles over a short boundary in an image such as the edge of a dark area adjacent a light area;

Figures 1, 2:
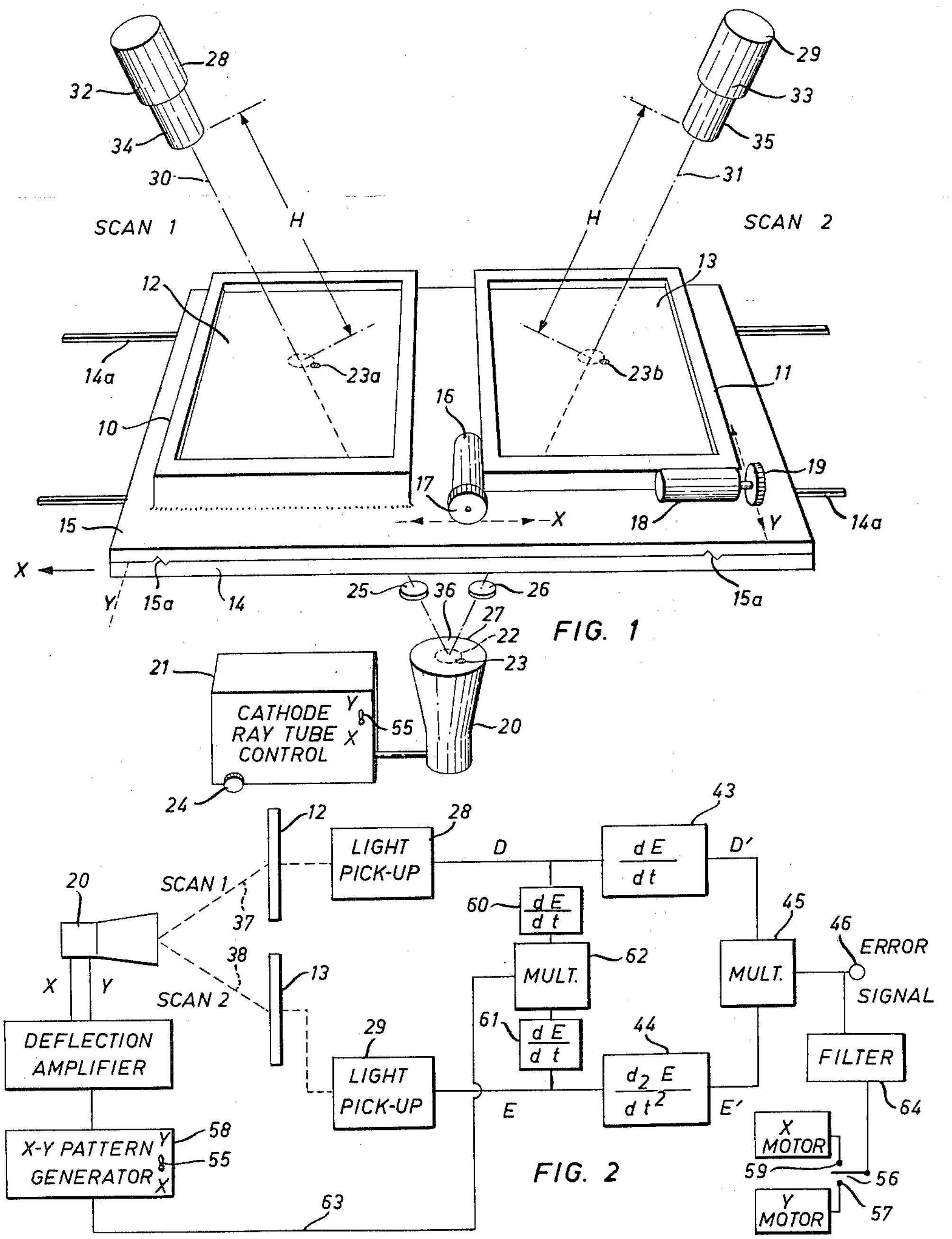
Figure 5:
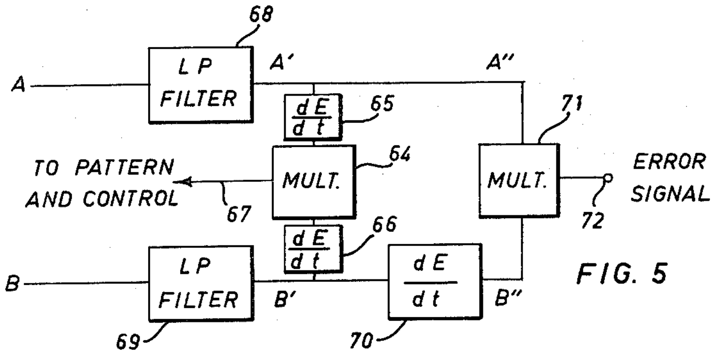
Figure 5 is a modified electrical schematic corresponding to Figure 2 but embodying a single power differential device only to establish a single order differential difference between the transient signals.
Figure 6:
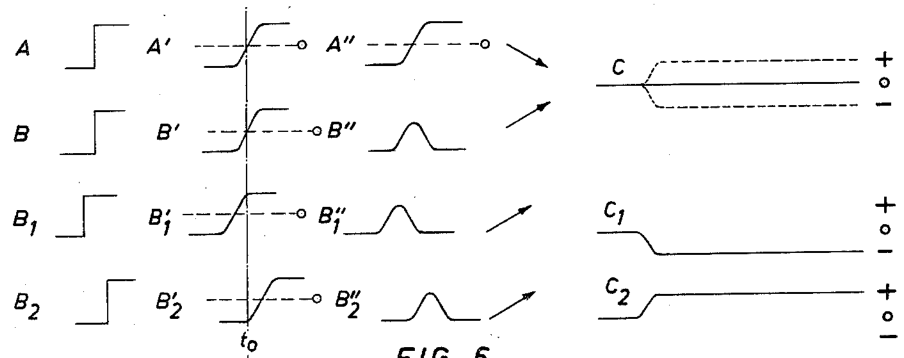
Figure 7:
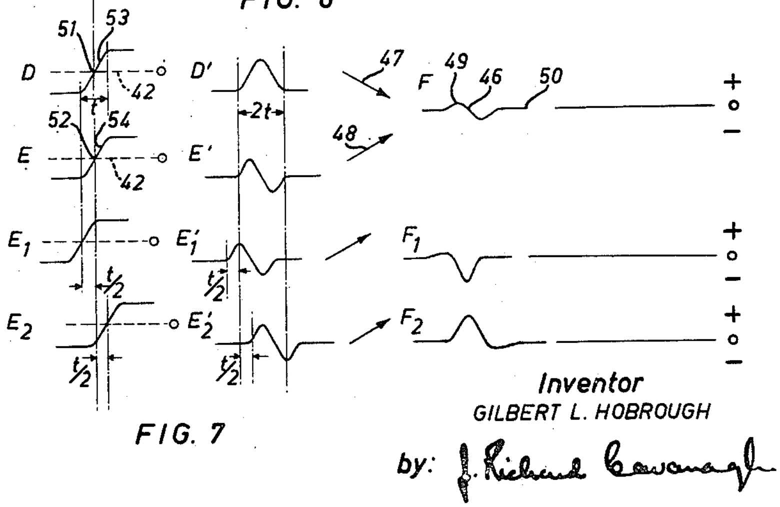

Figure 6 shows wave forms for signals A and B and the resulting output signal C for the method and apparatus of Figure 5 wherein it will be assumed that A and B signals are coincident in time, whereas signal $B_1$ is a B signal in advance of signal A, and signal $B_2$ is a B signal delayed with respect to signal A. It will be assumed that the signal $A''$ is multiplied in the one case with signal $B''$ to obtain signal C. In another case signal $A''$ is multiplied with signal $B_1''$ to obtain signal $C_1$. In a third case signal A'' is multiplied with signal $B_2''$ to obtain output error signal $C_2$;

In Figure 7 a series of wave forms is illustrated for the schematic diagrams of Figure 2 in which the coincident wave forms at D and E are of sloped characteristic encountered in practice, and in which the signals at D' and E' are multiplied as indicated by the arrows to obtain an output signal F. The wave form $E_1$ is an E signal leading the signal D in time. Also, the wave form $E_2$ is an E signal lagging the signal D in time. It will be observed that the wave form D' is a first differential of the wave form D, whereas the wave form E' is a second differential of the wave form at E. The corresponding output signals are indicated by wave forms $F_1$ and $F_2$.

In the drawings, one preferred form of scanning apparatus according to the invention is illustrated in Figure 1 in which the frames 10 and 11 shown in diagrammatic form are adapted each to carry one image such as one positive transparency or plate of a pair of stereographic transparencies designated respectively by numerals 12 and 13. The frames supporting base 14 is movable laterally in one co-ordinate direction on rails or guides 14*a*. A frame carrier 15 is slidable on guide means 15*a* in another co-ordinate direction on base 14. Frame 10 is fixed to carrier 15, image 12 being moveable therewith. The carrier 15 and base 14 embody openings (not shown) through which light may pass to images 12 and 13. An X co-ordinate servo motor 16, having a driving wheel 17, moves frame 11 on carrier 15 in an X co-ordinate direction. Y co-ordinate servo motor 18 having a drive wheel 19 rotatable thereby, moves the frame 11 on carrier 15 in a Y co-ordinate direction.

In one preferred form of apparatus a conventional cathode ray tube 20, driven by suitable cathode ray tube control 21 of conventional construction, generates a scanning pattern 22 with a suitable small scanning spot 23 of a scanning pattern size controllable by the control knob 24. Suitable lenses 25 and 26 form images 23*a* and 23*b* of the scanning spot 23 on images 12 and 13 and are aligned between the screen 27 of cathode ray tube 20 and light pick up devices in the form of photo multiplier tubes 28 and 29 to define scanning axes 30 and 31 for respective image scans hereinafter sometimes defined as scan 1 and scan 2. The photo multiplier devices 28 and 29 are contained within suitable casings 32 and 33, having lens systems 34 and 35 respectively associated therewith for providing the desired optical axis in each case. Each of the light pick up devices is disposed at equal angular and distance relation *h from* the screen 27 and images 12 and 13.

The scanning pattern appearing upon the screen 27 is such that the scanning dot may move in a random or predetermined pattern about the intersection of the axes 30 and 31, that is about the centre 36 of the screen. As a result each of the light pick up devices 28 and 29 will see the same scanning pattern on the images 12 and 13, and if both images are in alignment with respect to the axes 30 and 31 the axes will be passing through identical points in the images and the latter may be said to be in perfect alignment in respect of the particular point only. If a scanning dot, at any instant, is traversing a different point in one image than in the other a condition of perfect correlation cannot exist. It will likewise be apparent that there may be a condition wherein the scanning dot during a portion of its pattern travel may encounter identical image information in each image, but in another portion of its travel may encounter different information in each image. There may, therefore, be a condition of misalignment in one direction which can be expressed in terms of co-ordinate error. The circuitry of Figure 2 illustrates the system of the invention by which co-ordinate infomation in respect to alignment error may be expressed.

In the schematic of Figure 2 the size of scanning pattern is automatically controlled as an additional feature of this invention explained in detail hereinafter. At this juncture it may be assumed that the scanning spot is of suitable size to sense the necessary information as a desired degree of definition. The cathode ray tube 20 provides a light signal which is projected by the lens system in Figure 1 by the separate paths 37 and 38 to the images 12 and 13 and thence to the light pick up devices 28 and 29 adapted to develop transient signals which may by way of example be represented by wave forms D and E of Figure 7. For convenience the dual channel signal handling of the invention is identified in Figure 2 by the terms "scan 1" and "scan 2."

Figure 3:
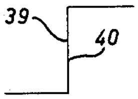
Figure 4:
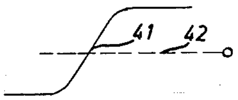
Figure 4 represents the type of boundary wave form encountered in practice having a sloped characteristic generally realized by virtue of some inherent graduation of light in the definition of a sharp boundary upon passing a scanning spot thereover.

While in the ideal theoretical sense any image boundary condition may be represented by a wave form of the kind indicated by numeral 39 of Figure 3 wherein the step portion *40* is truly vertical such a wave form will not be obtained in the ordinary practice of the invention. In the general sense a transient signal obtained by the traverse of a scanning spot at right angles over a sharp edge from a dark area to a light area will be characterized by a sloped portion 41 due to the diameter of the scanning spot. In practical effect, signal communicating circuitry will inherently embody some filtering effect whereby the relatively high frequency transient obtained will be somewhat smoothed, shaped and rendered symmetrical about a zero value line 42 is indicated in the wave forms D and E of Figure 7. In the schematic of Figure 2 this is inherently accomplished by the differentiating devices of 43 and 44 of known construction in the electronic arts, wherein the device 43 may embody conventional single order differentiating circuitry in which some degree of filtering is always inherent. The second order differential device 44 is also of established electronic construction and will embody filtering as is well-known.

It is of interest to observe, however, that the differentiating devices 43 and 44 operate to provide the wave forms D' and E' of Figure 7, wherein the wave form D' is proportional to the slope of the information signal wave form D. The separate wave form E' is proportional to the rate of change of slope of the information signal wave form E. The thus differentiated wave forms are then cross correlated by the conventional wave form multiplier 45 to obtain an error signal at 46 responsive in amplitude and sign to the magnitude and direction of the positional error of the momentary path of the scans. One form of multiplier which can be used is described in Electrical and Electronic series Fundamental of Television Engineering 1955 McGraw-Hill Book Co. Glassford at page 503 "The Double Balanced Modulator as a Multiplying Circuit." The multiplication of wave forms D' and E' is illustrated by arrows 47 and 48 to obtain the wave form at F having the multiplied ripple portion 49 equally disposed about the line of zero potential 50 adapted to be smoothed by appropriate filtering. The signals D and E result in an error signal of effectively zero value because the mid-points 51 and 52 of their sloped portions 53 and 54 respectively coincide with the zero axis 42 thereof at the same time instant $t_0$.

Now assume, for example, that the total time instant traversed by the sloped portions of the wave forms D and E equals a time instant $t$. Now, if wave form $E_1$ is sensed early by a time interval $t/2$ due to misalignment of the scans then the second differential of this wave form at $E_1'$ will be simultaneously misaligned with respect to the wave form D' and when multiplied therewith will provide a resulting error signal $F_1$ of resultant negative value, the amplitude of which is proportional to the negative time difference $t/2$.

On the other hand, if the wave form $E_2$ lags the wave form D by a time interval $t/2$ the second differential wave form $E_1'$ lags the wave form $D_1$ by a corresponding time interval, and when multiplied with the latter provides a positive going error signal $F_2$ responsive in magnitude and sign to the positive time difference error t/2 corresponding to the magnitude and direction of the alignment error. The error signal obtained represents the magnitude and sign of error in the momentary direction of scanning. Therefore, a continuously changing scanning direction will give a continuously changing indication of alignment error. Providing the direction component is known at any moment the error for a given scanning direction can be obtained directly.

Thus, by way of example, assuming that it is desired to confine the scanning to an X co-ordinate direction or to a Y co-ordinate direction according to the actuation of the control switch 55 on the cathode ray tube control device 21 of Figure 1. Stereoscopic pairs of images of the aerial survey type may be examined by noting that the images will correspond in the direction of the Y axis, but will embody differences in the X axis direction which are a function of the elevation of the topography photographed. Accordingly, the cathode ray tube control device 21 may first provide a Y axis trace, such scanning form being well-known in cathode ray tube control arts, the scanning pattern being in the form of a scan trace in the positive Y axis direction. The alignment error indicator will thus show a positive or negative Y axis alignment error enabling manual adjutment of frame 11 to reduce the error to zero.

Alternatively, as shown in Figure 2, the switch 56 carrying alignment error signal may be contacted to the switch contact 57 thereby energizing the Y co-ordinate servo motor 18 automatically effecting motion of frame 11 until the alignment error signal reduces to a value insufficient to drive the servo motor. The signal at L is shown communicating directly to the Y motor at 18, or alternatively to the X motor at 16 to indicate that the latter are responsive to such signal. Skilled persons will appreciate that the motors 16 and 18 are made responsive to such signal through suitable brige control amplifiers or other well-known expedients, whereby the motors are sufficiently energized to overcome their inherent inertia for a practical driving force until the alignment error signal becomes zero.

As soon as Y co-ordinate alignment is achieved as above outlined the cathode ray tube control device also embodying an X and Y axis switch 55 controlling the pattern generator 58 is switched to the X axis position to provide an X axis scanning trace. Again the alignment error indicator will indicate the magnitude and sign of alignment error in the X axis direction. Manual adjustment of frame 11 may be employed to bring this error to zero. Alternatively, switch 55 may be moved to engage contact 59 energizing the X servo motor, and effecting automatic drive by motor 16 of frame 11 to achieve zero alignment error. Upon achieving zero alignment error for corresponding points in the two images, the motion of frame 11 relative to the frame 10 required to achieve zero alignment error, for any other set of corresponding points, will be a function of the difference in elevation between the first set of points and the second set of points. Accordingly, knowing the elevation of one point in the images, the frame 11 may be positioned relative to a reference elevation. Thereafter the magnitude of alignment error or the distance of travel of frame 11 in the X co-ordinate direction will be a function of elevation from the reference elevation.

In operation an operator may be informed as above outlined of the momentary alignment error by the alignment error indicating device. In the described example of uni-directional scanning a uni-directional examination is made along one axis. The examination could be made in any other axis direction, but in the present example an X and Y co-ordinate examination is convenient for the extraction of information from aerial survey stereographic pairs of images. The only essential is that the direction of scanning trace be known at the moment of alignment error indication. A straight line scanning trace reduces the system to its simplest form.

The invention also contemplates that the magnitude of the scanning pattern may be controlled automatically to enable a condition of correlation of identical areas to be achieved by the scanning of minimum areas. According to the invention as the error signal is reduced to zero or a permissible minimum, the size of the scanning pattern may be reduced responsive to improved alignment. In practical effect it has been found that, in the initial stages of operations where the error signal may be large the scanning pattern will be extended to its maximum size, thereby enabling the system to operate on relatively large areas having a relatively small common portion, and therefore representing a substantial misalignment of the scanning axes. While in principle one can conceive a scanning pattern obtainig a maximum size effectively capable of covering the entire area of one of the images it has been found unnecessary to provide such a large scanning pattern in practice, for the reason that the operators without difficulty can roughly align the images within the capabilities of a scanning pattern of about one inch maximum dimension.

The automatic control of scanning pattern size is effected in the manner shown in Figures 2 and 5 by including single order differential devices 60 and 61 operative on the signals at D and E in Figure 2, and multiplying such differentiated signals by the multiplier 62 to obtain a pattern size control signal 63 for control of the pattern generator 58. The multiplied signal fed by line 63 is of maximum value when the signals at D and E are coincident in time. Such maximum signal is utilized to control the scanning pattern obtained from the pattern generator to minimum amplitude. As the signals at D and E differ in time instant, or are of lesser degree of coincidence in time the multiplied valve will be of lesser magnitude, whereby the pattern obtained from the pattern generator conversely is permitted to expand. Various methods may be utilized for applying the multiplied pattern control signal to the pattern generator. For example, the control signal may be converted to a direct current signal and utilized in conventional gain control circuitry in accordance with well-known practice.

In Figure 5 a similar multiplier 64 is shown for combining the signals A′ and B′ differentiated through the differential devices 65 and 66 to obtain a pattern size control signal by the line 67.

It is desired in particular to point out that the differential devices 60, 61, 65 and 66 of Figures 2 and 3 need not be supplied as separate components in the manner indicated. For example, the wave forms for signal A and B and the resulting output signal C are shown in Figure 6 for the method and apparatus of Figure 5, the signals A and B being coincident in time whereby the signal B″ is obtained by process of signal B through the single order differential device 70, and the signal C is obtained by multiplying signals A″ and B″ through multiplier 71 the signal C being available at terminal 72 of Figure 5. The signal $B_1$ is a B signal in advance of signal A and signal $B_2$ is a B signal delayed with respect to signal A. As shown the signal A″ is multiplied in the one case with signal B″ to obtain signal C as described. On the other hand the signal A″ may also be multiplied with signal $B_1''$ to obtain signal $C_1$. In a third case the signal A″ is multiplied with the signal $B_2''$ to obtain an error signal $C_2$ of opposite sense to the error signal $C_1$ for the lagging signal $B_2$ as contrasted to the leading signal $B_1$ relative to signal A. The two transient signals thus obtained that is the signals A and B contain information responsive to the information scanned in the respective images. Each of the transient signals will contain direct current components which are suppressed by means of suitable filtering which may be specially provided, or may be inherent to a sufficient degree in the circuit components employed. The two transient wave forms containing suppressed direct current components may be regarded as information signals.

According to this invention one of the information signals is processed to provide a wave form proportional to the slope of the information signal wave form, that is the information signal is differentiated to obtain a single order differential difference between the information signals. The information signals of single order differential difference are then cross correlated such as by multiplying, thus to obtain an error signal responsive in amplitude and sign to the magnitude and direction of the positional error of the momentary path of the scanning spots on the images. In the preferred practice of the invention both information signals are differentiated in a manner providing a single order differential difference therebetween, such as by applying a single order differentiation to the other. The cross correlation of the single order differential difference information signal wave forms effects a discrimination therebetween as to time whereby the error signal is a measure of time difference and hence misalignment error the direction of which is known due to the known direction of the momentary scanning path. In this sense, therefore, these signals are discriminated with respect to time to obtain the error signal.

What I claim as my invention is:

1. The method of scanning corresponding areas of two images having similar information therein and comprising, in combination; establishing a scanning spot on each of said images; establishing a path of predetermined direction on each of said images; moving said scanning spots simultaneously on said paths; independently sensing the information encountered in each image by each scanning spot during motion on its path; generating a transient information signal for each image responsive to the information sensed; processing said information signals to establish a single order differential difference therebetween; multiplying said processed signals to generate thereby an error signal responsive to the time difference between said processed signals and thus responsive to the positional error of the scanned areas of said images.

2. The method of scanning corresponding areas of two images having similar information therein and comprising, in combination: moving a scanning spot simultaneously over each of said images on a momentary path of predetermined direction; independently sensing the information encountered in each image by said scanning spot during motion on said momentary path; generating a transient information signal for each image responsive to the information sensed, said signal having an unwanted direct current component; suppressing the direct current component in said signals and differentiating at least one of said signals whereby the latter are rendered of improved significant information content and of single order differential difference; measuring the time difference between said signals of single order differential difference; generating an error signal responsive to said time difference, and thereby responsive to the positional error of the areas scanned by said momentary scanning paths on said images; and shifting one of said images responsive to said error signal to reduce the magnitude of the latter and to achieve effectively coincident scanning of said areas.

3. A system for locating corresponding areas in two similarly oriented images having similar information on co-ordinate axes therein, and comprising: means for moving a scanning spot simultaneously over each of said images on a momentary path of predetermined direction with reference to said co-ordinate axes; means for independently sensing the information encountered in each image by said scanning spot during motion on said momentary path; means for generating a transient information signal responsive to the information sensed by said sensing means, said signal containing an unwanted direct current component; means for independently processing said transient information signals effecting suppression to said unwanted direct current component therein, and establishing a single order differential difference therebetween; means comparing said processed signals with respect to time; means generating an error signal responsive to the time comparison of said processed signals and thus the positional error of the scanned area of said images with respect to said co-ordinate axes; and means responsive to said error signal for moving the momentary path of said scanning spot relative to at least one of said images to correct the positional error of the scanned area thereof, thereby reducing said error signal effectively to zero.

4. The system claimed in claim 3 in which said signal processing means comprises means for processing one of said information signal wave forms to provide a wave form of an amplitude proportional to the slope of the information signal wave form; and means for processing the other of the signal wave form to provide a wave form of an amplitude proportional to the rate of change of slope of the other information signal wave form.

5. The system claimed in claim 3 in which said signal processing means comprises: a single order differential device providing a wave form of an amplitude proportional to the slope of one of the information signal wave forms; and a second order differential device providing a wave form of an amplitude proportional to the rate of change of slope of the other information signal wave form.

6. A system for locating corresponding areas in two similarly orientated images having similar information on co-ordinate axes therein, and comprising, in combination: means establishing a scanning axis for each of said images, including means for simultaneously scanning each image with a scanning spot movable on a momentary path about the scanning axis thereof in a predetermined direction with reference to said co-ordinate axes; means for independently sensing the information encountered in each image by said scanning spot during motion on said momentary path, thereby to define with said information the point of said image intersected by the scanning axis; means generating an information signal responsive to the information sensed by said sensing means; a single order differential device providing single order differentiation of one of said information signals; a second order differential device providing a second order differentiation of the other information signal and means multiplying said differentiated signals with respect to time providing a multiplied information signal responsive to the positional error of said scanning axes on said images with respect to said co-ordinate axes.

7. A system for locating corresponding areas in two similarly orientated images having similar information on co-ordinate axes therein, and comprising, in combination: means establishing a scanning axis for each of said images, including means for simultaneously scanning each image with a scanning spot movable on a momentary path about the scanning axis thereof in a predetermined direction with reference to said co-ordinate axes; means for independently sensing the information encountered in each image by said scanning spot during motion on said momentary path, thereby to define with said information the point of said image intersected by the scanning axis; means generating an information signal responsive to the information sensed by said sensing means; a single order differential device providing single order differentiation of one of said information signals; a second order differential device providing a second order differentiation of the other information signal; means multiplying said differentiated signals with respect to time providing a multiplied information signal responsive to the positional error of said scanning axes on said images with respect to said co-ordinate axes; and means responsive to said multiplied information signal for moving the momentary path of said scanning spot relative to at least one of said images to correct the positional error of the scanning axis thereof, thereby reducing said multiplied signal effectively to zero.

8. A system for locating corresponding areas in two similarly orientated images having similar information on co-ordinate axes therein, and comprising, in combination: means establishing a scanning axis for each of said images, including means for simultaneously scanning each image with a scanning spot movable on a momentary path about the scanning axis thereof in a predetermined direction with reference to said co-ordinate axes; means for independently sensing the information encountered in each image by said scanning spot during motion on said momentary path, thereby to define with said information the point of said image intersected by the scanning axis; means generating an information signal responsive to the information sensed by said sensing means; a single order differential device providing single order differentiation of one of said information signals; a second order differential device providing a second order differentiation of the other information signal; means multiplying said differentiated signals with respect to time providing a multiplied information signal responsive to the positional error of said scanning axes on said images with respect to said co-ordinate axes; and a scanning pattern generator establishing a scanning pattern for said scanning spot of which said momentary path forms an instantaneous portion.

9. A system for locating corresponding areas in two similarly orientated images having similar information on co-ordinate axes therein, and comprising, in combination: means establishing a scanning axis for each of said images, including means for simultaneously scanning each image with a scanning spot movable on a momentary path about the scanning axis thereof in a predetermined direction with reference to said co-ordinate axes; means for independently sensing the information encountered in each image by said scanning spot during motion on said momentary path, thereby to define with said information the point of said image intersected by the scanning axis; means generating an information signal responsive to the information sensed by said sensing means; a single order differential device providing single order differentiation of one of said information signals; a second order differential device providing a second order differentiation of the other information signal; means multiplying said differentiated signals with respect to time providing a multiplied information signal responsive to the positional error of said scanning axes on said images with respect to said co-ordinate axes; a scanning pattern generator establishing a scanning pattern for said scanning spot of which said momentary path forms an instantaneous portion; means providing a pattern control signal responsive in amplitude to the multiplied single order differential of said information signals; and means effectively biasing the scanning pattern provided by said pattern generator responsive to said pattern control signal to provide a scanning pattern of maximum amplitude when said control signal is zero.

References Cited in the file of this patent

UNITED STATES PATENTS

| | | |
|---|---|---|
| 2,283,226 | Porter | May 19, 1942 |
| 2,563,892 | Waller | Aug. 14, 1951 |
| 2,641,712 | Kircher | June 9, 1953 |
| 2,659,823 | Vossberg | Nov. 17, 1953 |
| 2,679,636 | Hillyer | May 25, 1954 |
| 2,703,150 | Rieber | Mar. 1, 1955 |
| 2,787,188 | Berger | Apr. 12, 1957 |
| 2,790,844 | Neugebauer | Apr. 30, 1957 |

FOREIGN PATENTS

| | | |
|---|---|---|
| 765,445 | Great Britain | Jan. 9, 1957 |